May 6, 1969  M. ORAIN  3,442,096
BELLOWS FOR PROTECTING SLIDING DEVICES
Filed March 10, 1967
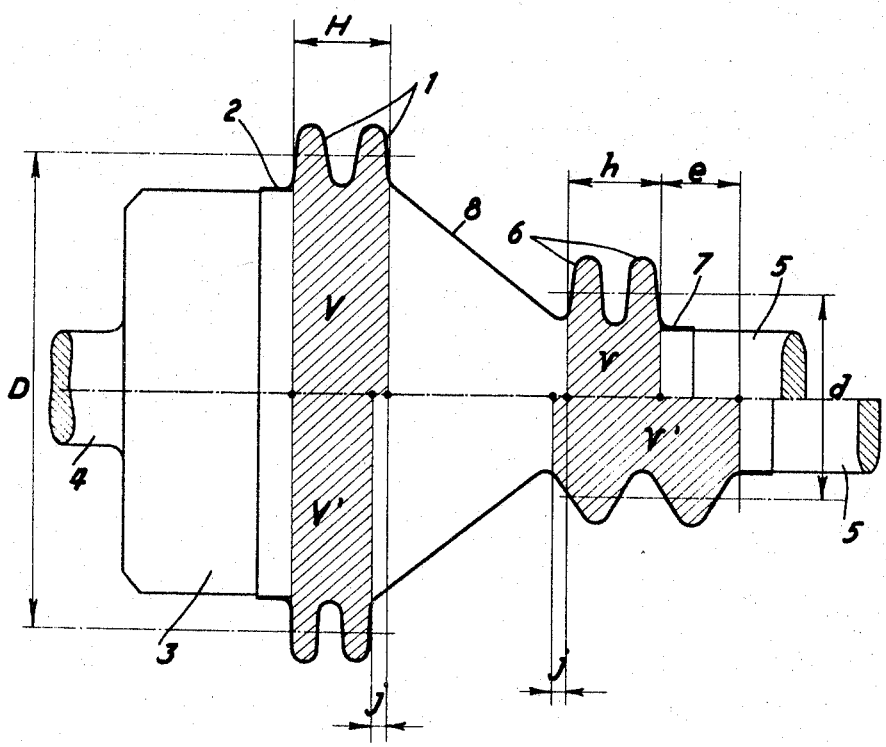
Inventor:
Michel Orain
By Baldwin, Wight, Diller & Brown
Attorneys

United States Patent Office 3,442,096
Patented May 6, 1969

3,442,096
BELLOWS FOR PROTECTING SLIDING DEVICES
Michel Orain, Courbevoie, France, assignor to Societe Anonyme: Glaenzer Spicer, Poissy, Yvelines, France, a corporation of France
Filed Mar. 10, 1967, Ser. No. 622,137
Claims priority, application France, Mar. 18, 1966, 54,143
Int. Cl. F16d *3/84*
U.S. Cl. 64—32                           2 Claims

ABSTRACT OF THE DISCLOSURE

The present invention provides bellows for sliding devices, particularly for sliding joints, in which the pressure prevailing in their interior remains equal to the outside pressure during the different elongations undergone by the universal joint and the bellows during rotation of the shafts.

---

This invention relates to bellows for protecting sliding devices, particularly sliding universal joints.

By way of illustration of the prior art, mention may be made of French Patent No. 1,342,249 which describes bellows intended to retain lubricants surrounding universal joints making an angular connection between coupling shafts. These bellows, however, are not suitable for sliding universal joints the utilisation of which, contrarily to the case of joints of the abovementioned type, is accompanied by variation of volume of the space bounded by the protective bellows.

It is known that sliding universal joints for transmissions serve the purpose of connecting two shafts transmitting a torque, said shafts being able to form between them a fixed or variable angle and to be displaced axially in relation to one another.

These joints are generally contained in a bath of lubricant, an oil or grease, imprisoned in an elastic sleeve or bellows each of the ends or necks of which is fixed in sealing engagement with a part of the universal joint secured to one of the two shafts connected by said joint.

It follows that during operation of the shafts, the bellows must not only adapt itself to the angular variations between the shafts, but must also accompany the changes of their relative axial positions.

In bellows of known types it appears that the problem of the ability of the bellows to adapt itself to elongations of the joint has not been solved in a satisfactory manner. This results in a certain number of disadvantages when changes of distance between the shafts to be connected are made.

Thus when the shafts to be connected are brought closer together the following occurs:

Either the lubricant inside the bellows is subjected to elevated pressure, resulting in considerable stressing of the seal of the bellows to the mechanical parts, and the risk of a leakage of lubricant; or the wall of the bellows will swell out or there will be a considerable alteration of the symmetry of said wall, with the result that there will be a substantial reduction of the ability of the bellows to adapt itself angularly and a risk that the wall will be folded at a sharp angle, causing the well to rub against parts of the joint so that the bellows may be put out of action by abrasion.

In the event of the shafts to be coupled being moved further apart from one another, the following occurs:

Either the lubricant inside the bellows is subjected to a reduction in pressure, which may result in the admission of air and consequently, in the event of the shafts subsequently being moved closer to one another, an increase of the normal maximum pressure, with the disadvantages mentioned above; or the wall of the bellows will curve inwardly, entailing the same disadvantages as result from swelling due to elevated pressure.

An expedient adopted to avoid these various disadvantages consists in leaving a certain proportion of air within the bellows, the compressibility of which is intended to permit a variation of volume defined by the bellows due to the change of the axial distance between the shafts coupled by the sliding joint. Nevertheless, this expedient in turn has disadvantages, because use is only made of the compressibility of the air when the pressure is elevated, and there is the consequent risk of leaks. Furthermore, under the action of variations of temperature due to the operation of the joint near mechanical members which reach high temperatures or are under special atmospheric conditions, the air contained in the bellows expands and there is an additional risk of a rise in the internal pressure with the risk of leaks, swelling, deformation, etc. Also, during rotation of the joint, the lubricant is centrifuged towards the wall of the bellows, thus creating a central core occupied by the air introduced, and this results in the failure to lubricate the central portions of the universal joint.

The aim of the present invention is to provide bellows for sliding devices, particularly for sliding joints, which are free from the disadvantages described above and in which the pressure prevailing in their interior remains equal to the outside pressure during the different elongations undergone by the universal joint and the bellows during rotation of the shafts. In other words, the inside volume of the bellows can remain constant while its two necks move towards or away from each other, without the profile of the bellows suffering any abnormal modification.

The result is that drops or rises in internal pressures are avoided and the risks of leakage, swelling, folding at a sharp angle, rubbing, and wear through friction are eliminated. In addition, the full quantity of lubricant can be filled into the bellows, no matter what elongation may occur, thus enabling the mechanism of the universal joint to be permanently bathed by lubricant during its rotation.

According to the present invention, bellows for protecting sliding devices and particularly, for sliding universal joints comprises at least one fold of large diameter, and at least one fold of small diameter, and a substantially truncated conical intermediate portion effecting the connection between the folds of large and small diameter, which intermediate portion is non-deformable in comparison with said folds, the arrangement being that the flexibility of the bellows occurs at the folds and the diameters of the folds being so determined that the volume of the whole device remains constant whatever the elongations undergone by the device as a whole may be.

An embodiment of bellows constructed in accordance with the invention is described hereinbelow, simply by way of example and without limitation, with reference to the accompanying drawing, in which the single figure illustrates said bellows diagrammatically in longitudinal section.

In the drawing, the top half-section illustrates the bellows in an unstressed position, while the bottom half-section shows it after it has been elongated by an amount $e$.

In the embodiment illustrated, the bellows has two folds 1 of large diameter D, which are situated near a neck 2 which is connected to the larger part 3 of the universal joint, which is not further illustrated. The part 3 is integral with a transmission shaft 4 which has to be connected to another shaft 5 by the universal joint.

At its other end, the bellows has two folds 6 of small diameter $d$, which are situated near a neck 7 connected to the smaller part of the universal joint, such as, for example, the shaft 5 itself.

The fold portions 1, 6 of the bellows are connected together by a substantially truncated conical portion 8.

It will be seen that the only variable volumes inside the bellows are the two spaces bounded at their peripheries by the large folds 1 (spaces V and V' at top and bottom, respectively as seen in the lefthand side of the figure) and by the small folds 6 (spaces v and v' at top and bottom, respectively, as seen in the right-hand side of the figure).

So that, after the elongation $e$, there will be no modification of pressure inside the bellows, it is necessary that the total volume of the latter should not have changed.

This condition can be written as follows:

$$V+v=V'+v'$$

or $$\pi\frac{D^2 H}{4}+\pi\frac{d^2 h}{4}=\pi\frac{D^2(H-j)}{4}+\pi\frac{d^2(h+e+j)}{4}$$

or $$\pi\frac{D^2 j}{4}=\frac{d^2(e+j)}{4}$$

where $D$=the mean diameter of the large folds 1
$H$=the unstressed length of that portion of the bellows accomodating the large folds 1
$d$=the mean diameter of the small folds 6
$h$=the unstressed length of that portion of the bellows accomodating the small folds 6
$j$=displacement of the truncated cone, and
$e$=total elongation of the bellows From this relation it is possible to deduce that the displacement $j$ of the truncated cone 8 in dependence on the elongation $e$:

$$j=\frac{e}{\frac{D^2}{d^2}-1}$$

The total elongation of the small folds of mean diameter $d$ is: $e+j$. This elongation is limited by considerations of fatigue behaviour of the elastomer constituting the bellows. Now the value of $e$ is a constant, and therefore it is important that the ratio: $e/e+j$ should be as great as possible.

Now, $$\frac{e}{e+j}=1-\frac{d^1}{D^2}$$

and this condition is obtained by making the ratio $D^2/d^2$ as large as possible, i.e. $D>d$ wihch exxplains the reason for the large folds 1 and small folds 6.

It will moreover be seen that if this difference in diameter did not exist, the elongation $e$ at constant volume would be zero, and the bellows would not correspond to the characteristics described above.

What is claimed is:

1. A flexible bellows for protecting sliding devices, such as for example two transmission shafts connected together by a universal joint, said bellows comprising first fold means including at least one fold of relatively large diameter, second fold means including at least one fold of relatively small diameter as compared to the diameter of said at least one first fiold means fold, and a substantially truncated conical intermediate portion connecting said first and second fold means, the flexibility of the bellows being provided in the regions of said fold means, said intermediate portion being relatively indeformable in comparison with said fold means, and said diameters of said folds being determined whereby the volume defined by the whole bellows remains constant whatever may be the elongation of said bellows as a whole.

2. A bellows according to claim 1, which is particularly adapted to protect universal joints in which one part of said joint is of greater diameter than the other joint part, said first fold means being adapted to be connected to said joint part of greater diameter and including at least two folds of said relatively large diameter said second fold means being adapted to be connected to said other joint part and including at least two folds of said relatively small diameter.

References Cited

UNITED STATES PATENTS

| | | | |
|---|---|---|---|
| 1,799,661 | 4/1931 | Weiss | 64—32 |
| 2,702,996 | 3/1955 | Davis | 64—32 |
| 3,218,827 | 11/1965 | Aucktor | 64—8 |

FOREIGN PATENTS 1,342,249  9/1963  France.

HALL C. COE, *Primary Examiner.*